(12) United States Patent
Mori et al.

(10) Patent No.: US 11,843,289 B2
(45) Date of Patent: Dec. 12, 2023

(54) METHOD FOR MANUFACTURING A CORE ELEMENT FOR AN ELECTRIC MACHINE

(71) Applicant: Mitsubishi Electric Corporation, Tokyo (JP)

(72) Inventors: Akihito Mori, Tokyo (JP); Naoya Hashimoto, Tokyo (JP); Kiyoshi Nakano, Tokyo (JP); Kazuya Hasegawa, Tokyo (JP); Norihiro Murata, Tokyo (JP); Tomoyuki Kinoshita, Tokyo (JP); Kensaku Kuroki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 61 days.

(21) Appl. No.: 17/350,278

(22) Filed: Jun. 17, 2021

(65) Prior Publication Data

US 2022/0109354 A1    Apr. 7, 2022

(30) Foreign Application Priority Data

Oct. 6, 2020 (JP) ................. 2020-168828

(51) Int. Cl.
*H02K 15/02* (2006.01)
*B21D 28/26* (2006.01)

(52) U.S. Cl.
CPC ........... *H02K 15/024* (2013.01); *B21D 28/26* (2013.01)

(58) Field of Classification Search
CPC ........ B21D 28/02; B21D 28/22; B21D 28/26; B21D 43/02; H02K 15/022; H02K 15/024
See application file for complete search history.

(56) References Cited

U.S. PATENT DOCUMENTS

| | | | |
|---|---|---|---|
| 10,063,126 B2 * | 8/2018 | Sasaki ................. | H02K 15/02 |
| 2006/0119209 A1 * | 6/2006 | Nishizawa ............ | H02K 15/02 |
| | | | 310/216.053 |

(Continued)

FOREIGN PATENT DOCUMENTS

| | | |
|---|---|---|
| JP | 63-248528 A | 10/1988 |
| JP | 2013-27205 A | 2/2013 |
| JP | 2016-226140 A | 12/2016 |

OTHER PUBLICATIONS

Office Action dated Mar. 22, 2022 from the Japanese Patent Office in JP Application No. 2020-168828.

(Continued)

*Primary Examiner* — Minh N Trinh
(74) *Attorney, Agent, or Firm* — Sughrue Mion, PLLC; Richard C. Turner

(57) ABSTRACT

In a method for manufacturing a core element which is used for a divisional layer stack core of a rotary electric machine, the method includes: a first punch cutting out process for punch cutting out a first core element having a product shape, from a belt like electromagnetic steel sheet, with a press mechanism which has a feeding device of the electromagnetic steel sheet, a feeding process for feeding the electromagnetic steel sheet, with the feeding device, and a second punch cutting out process for positioning with a product shaped pilot which has an external shape of the core element, using a punch cut out trace shape of the first core element, and producing a second core element having the product shape, by punch cutting out with the press mechanism.

11 Claims, 11 Drawing Sheets

(56) References Cited

U.S. PATENT DOCUMENTS

| | | | |
|---|---|---|---|
| 2008/0307634 A1* | 12/2008 | Nishizawa ........... | H02K 15/024 |
| | | | 29/598 |
| 2010/0154968 A1* | 6/2010 | Shirai ..................... | B32B 41/00 |
| | | | 156/64 |
| 2013/0020010 A1 | 1/2013 | Namaike et al. | |
| 2017/0005551 A1* | 1/2017 | Sasaki .................... | H02K 15/02 |
| 2022/0109354 A1* | 4/2022 | Mori ...................... | B21D 28/26 |

OTHER PUBLICATIONS

Notice of Reasons for Refusal dated Oct. 26, 2021 from the Japanese Patent Office in Japanese Application No. 2020-168828.

* cited by examiner

SECTIONAL VIEW IN BB

METHOD FOR MANUFACTURING A CORE ELEMENT FOR AN ELECTRIC MACHINE

FIELD OF THE INVENTION

The present disclosure relates to a method and apparatus for manufacturing a core element which is used for a divisional layer stack core of a rotary electric machine, and a method for manufacturing a divisional layer stack core.

BACKGROUND OF THE INVENTION

In existing punch cutting methods of a core element for a divisional layer stack core of rotary electric machine use, core elements or divisional iron cores, which become products, are disposed on an electromagnetic steel sheet in a zig zag manner. On a part of the steel sheet, which is not used for punch cutting out as a product shape, pilot pins and others are disposed. By so doing, positioning accuracy in the forward feeding direction of the steel sheet is improved, the punch cutting out dimension of a product is secured, and the utilization of materials is achieved. Further, pilot pins are used to conduct positioning of the steel sheet at the time of punch cutting out. One of these punch cutting out methods of the core element for the divisional layer stack core of rotary electric machine use is dealt in Patent Document 1, for example.

CITATION LIST

Patent Literature

Patent Document 1 JP 2016-226140 A

SUMMARY OF THE INVENTION

Technical Problem

According to the apparatus for manufacturing a rotary electric machine which is disclosed in Patent Document 1, a core element or a divided stator iron core is formed by punch cutting out from a belt like electromagnetic steel sheet with a die. The configuration of the core element consists of a back yoke portion which lies in the external diameter side of a rotary electric machine, and a teeth portion which projects toward the internal diameter side thereof. As for the layout at the time of punch cutting out, core elements are disposed in a face to face arrangement, changing their respective directions in a staggering manner. Further, pilot pins and others are disposed on the steel sheet which is not used as a product shape. Thereby, the positioning accuracy is improved in the forward feeding direction of a steel sheet, the punch cutting out dimension of a product is secured, and improved material yield rates are achieved.

In general, positioning of an electromagnetic steel sheet which becomes material, is performed with pilot pins, and the steel sheet is given a fixed amount of feeding, and then, punch cutting out is conducted thereon. However, when the stiffness of a steel sheet is not enough, positioning merely with pilot pins produces twist or torsion on the steel sheet, and there arise problems that intended amount of feeding is not secured, the material becomes tilted, and the like. In particular, pilot pins are disposed only at end portions of the steel sheet, provided in a direction perpendicular to a material feeding direction, and then, some issues are created. For example, positioning merely with pilot pins fails to conduct a high speed conveyance by press and fails to conduct a high speed punch cutting out.

Further, when a pilot pin and a punch cutting out portion of the core element are much closely disposed in order to improve a material yield rate, there arises a problem that the die of a core element will suffer breakage. Therefore, present application finds it objects to secure the accuracy in punch cutting out, as well as, to improve the material yield rate.

Further, one product shape is punch cut out, through a plurality of punch cutting out processes and there are many matching cut portions which are provided for cutting a cut and tie portion. Then, there are problems that variations in the positioning dimension with pilot pins make a profound influence and the dimensional accuracy of punch cutting out becomes deteriorated.

The present application has been made to solve such problems, and has objectives to offer solutions which enable to punch cut out precisely a plurality of board like core elements, from a rolled belt like electromagnetic steel sheet, as well as, to conduct a high speed punch cutting out without reducing a material yield rate.

Solution to Problem

The manufacturing method in accordance with the present disclosure is a method for manufacturing a core element which is used for a divisional layer stack core of a rotary electric machine, and the method includes: a first punch cutting out process for punch cutting out a first core element having a product shape, from a belt like electromagnetic steel sheet, with a press mechanism which has a feeding device of the electromagnetic steel sheet, a feeding process for feeding the electromagnetic steel sheet, with the feeding device, and a second punch cutting out process for positioning with a product shaped pilot which has an external shape of the core element, using a punch cut out trace shape of the first core element, and punch cutting out a second core element having the product shape, with the press mechanism.

Advantageous Effects of Invention

In the method for manufacturing a core element in accordance with the present disclosure, the dimensional accuracy of a product can be increased, since punch cutting out is conducted so that an exact product shape of the core element can be produced. Further, since positioning in the core element punch cutting out is conducted using the punch cut out trace of the product shape, high speed punch cutting out can be conducted without reducing a material yield rate.

DESCRIPTION OF EMBODIMENTS

Embodiment 1

Figure 1:
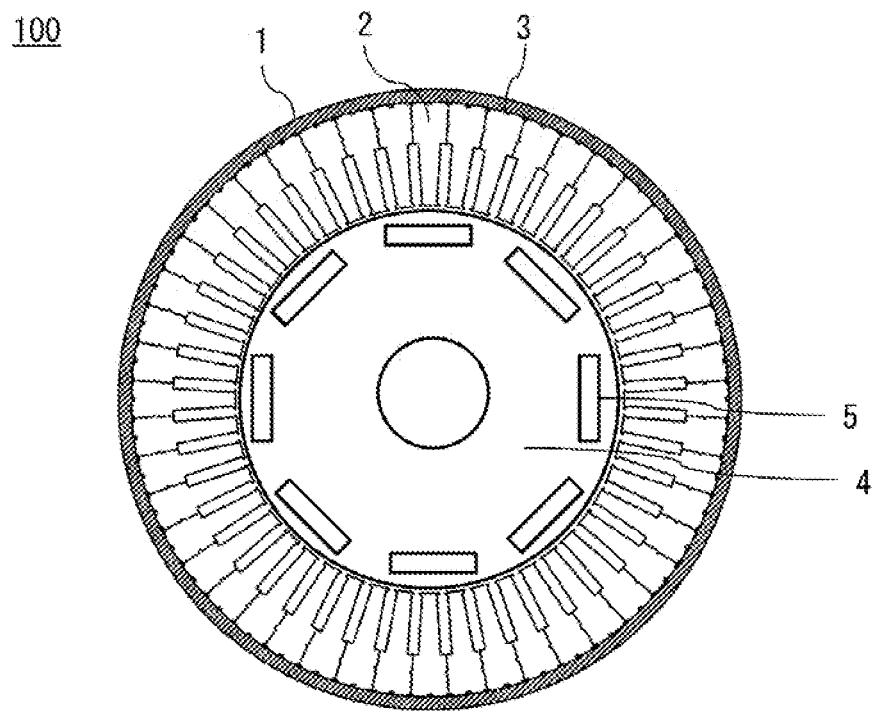
FIG. 1 is a plane view which shows a rotary electric machine using core elements and divisional layer stack cores, in accordance with Embodiment 1.

Explanation will be made about a method and apparatus for manufacturing a core element which is used for a divisional layer stack core of a rotary electric machine. FIG. 1 is a plane view which shows a rotary electric machine using core elements and divisional layer stack cores, in accordance with Embodiment 1. In FIG. 1, a rotary electric machine 100 has a structure comprising a stator core 3 which includes, on the inside of a frame 1, divisional layer stack cores 2, linked together in a circular pattern, to have a contact with next one, and a rotor 4 which is disposed on the inside of the stator core 3. FIG. 1 shows an exemplary case which is provided with magnets 5 on the rotor 4, however, the rotor of an induction motor which does not include a magnet can be accepted here.

The divisional layer stack core 2 is a layer stack iron core, made of layer stacked core elements, which are punch cut out from an electromagnetic steel sheet. The core element consists of a back yoke portion disposed at the external diameter side, and a teeth portion which protrudes from the back yoke portion to the internal diameter side and forms a magnetic pole. The stator core 3 is formed of divisional layer stack cores 2, which are linked together, in a circular pattern and in a circumference direction of the rotary electric machine 100, to have a contact with next one. This stator core is held in the internal circumference of the frame 1 of ring like shape, by press fit or burn in.

Figure 2:
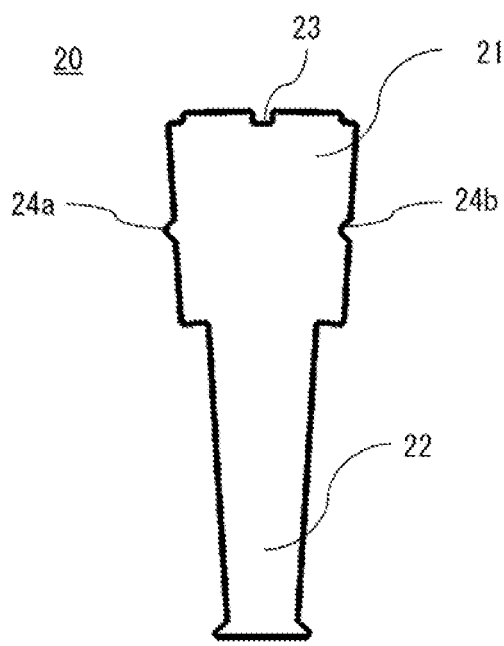
FIG. 2 is a plane view which shows a core element in accordance with the Embodiment 1.
Figure 3:
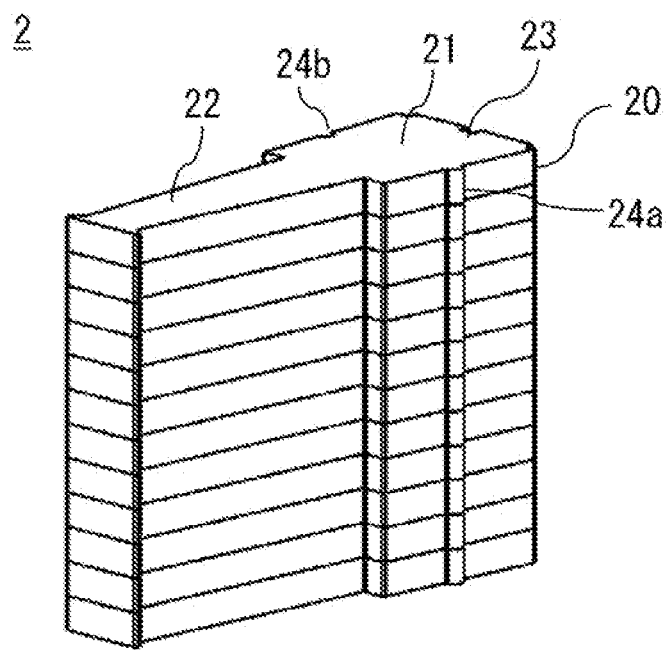
FIG. 3 is a perspective view which shows a divisional layer stack core in accordance with the Embodiment 1.

In FIG. 2, shown is a core element 20 which is punch cut out from a belt like electromagnetic steel sheet. In FIG. 3, shown is an example of a divisional layer stack core 2, where core elements 20 are layer stacked one by one, and those respective core elements 20 are fixed together in a layer stack direction, by welding or gluing or swaging, to make a mass of block state. In FIG. 2 and FIG. 3, shown is the configuration of a teeth portion 22, which protrudes toward an inner radial direction, from a back yoke portion 21. At the center of the external diameter side of the back yoke portion 21, there is provided a dovetail groove portion 23 for adjusting the arrangement of core elements 20 at the time of layer stacking. Further, in the back yoke portion 21, there are provided a core positioning convex portion 24a and a core positioning concave portion 24b, which become positionings, when divisional layer stack cores 2 are linked together to be combined in a circular manner. Because the teeth portion 22 will be wound with coil, a thin portion thereof is formed with respect to a circumferential direction. In this way, the core element 20 has a sector shape which includes a wide part in the back yoke portion 21 and a narrow tapered part in the teeth portion 22.

Figure 4:
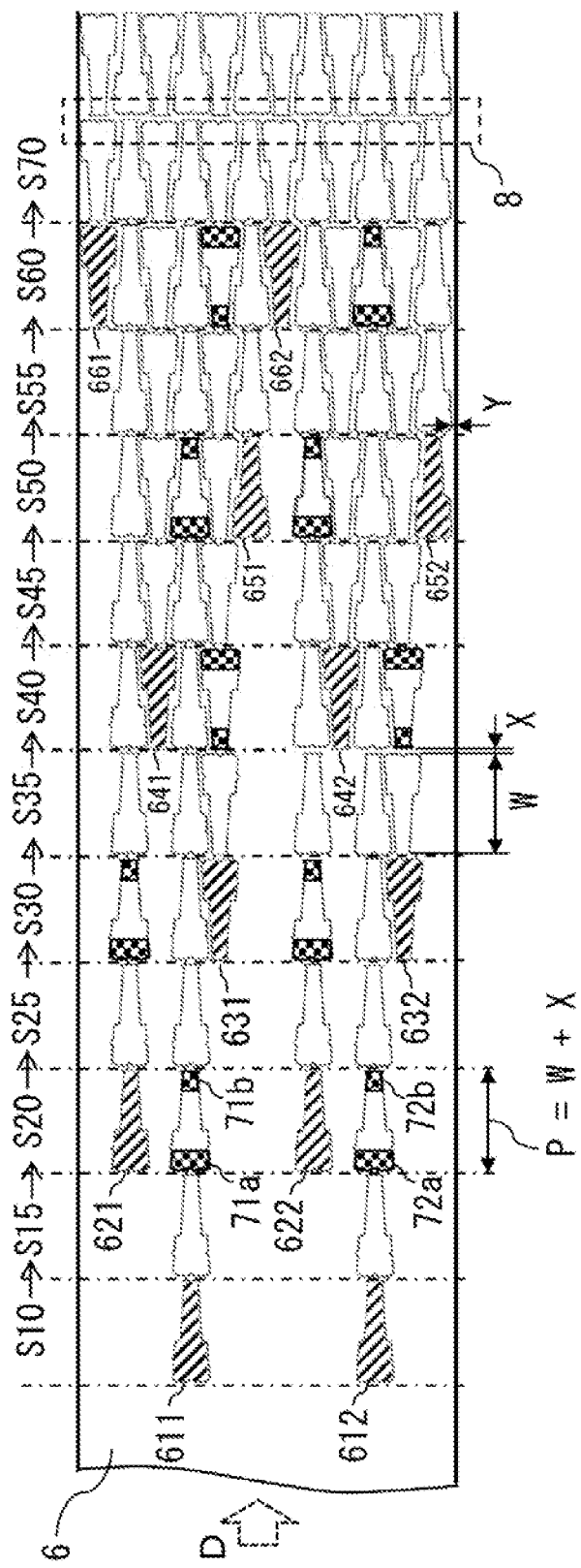
FIG. 4 is a plane view of an electromagnetic steel sheet for explaining a method for manufacturing a core element in accordance with the Embodiment 1.

Next, explanation will be made about a method for manufacturing a core element 20. FIG. 4 presents the concept of the method for manufacturing the core element, by using a plane view of an electromagnetic steel sheet 6. Further, the flow of manufacturing processes is represented in a flow chart of FIG. 5. More specifically, the process is performed with a manufacturing apparatus 500 of the core element, which becomes a press mechanism, shown in FIG. 6. The manufacturing apparatus 500 of the core element is composed of a press device 300 and a die device 400. The press device 300 feeds a belt like electromagnetic steel sheet 6 which is rolled in a cylinder shape, from an uncoiler (not shown in the figure), with a feeding device 310. The core element 20 is produced by punch cutting out of the electromagnetic steel sheet 6 with the die device 400.

In FIG. 4, a case example is shown as the present embodiment, in which the punch cutting out process of the core element 20 includes six steps, and punch cutting out is conducted at two spots in each of the steps, then, at twelve spots in total. Toward the forward feeding direction D of the electromagnetic steel sheet 6, the punch cutting out process of the core element has the step S10 of the first punch cutting out process to the step S60 of the sixth punch cutting out process, and the step S70 of the scrap cut process. Step S15 to step S55 of the electromagnetic steel sheet feeding are provided, between the respective processes, for feeding an electromagnetic steel sheet 6.

Figure 5:
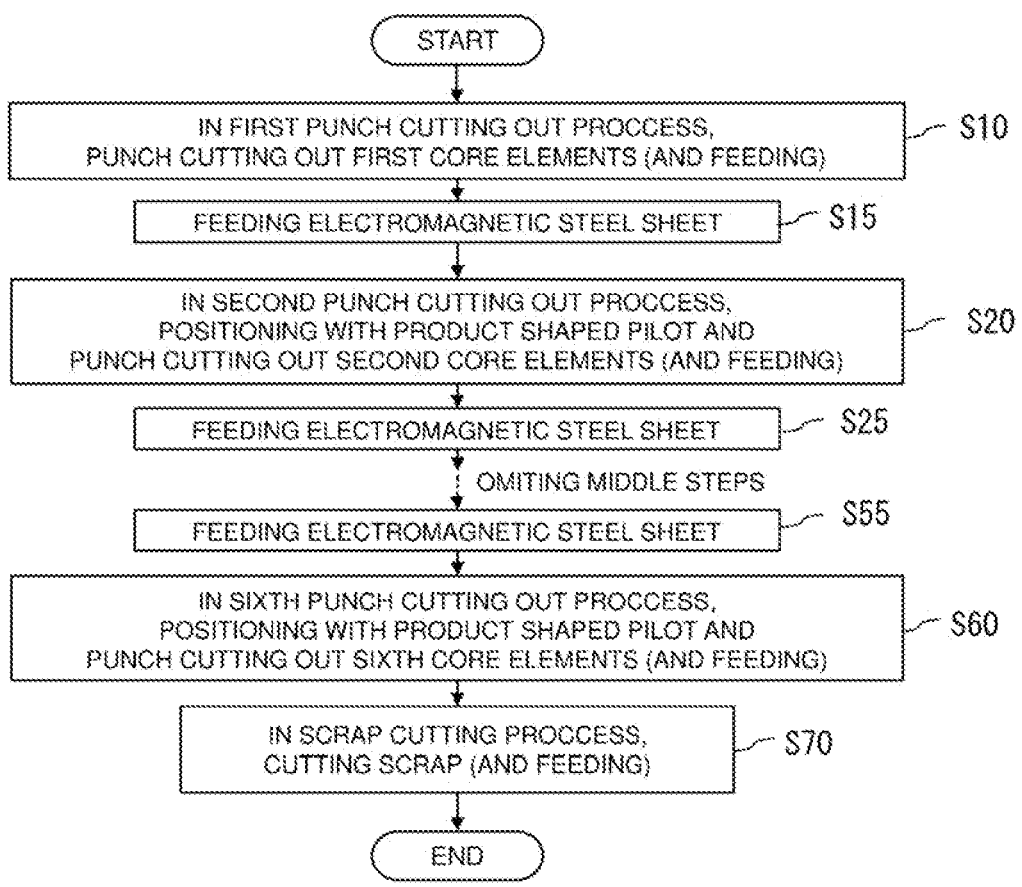
FIG. 5 is a flow chart which shows the method for manufacturing the core element in accordance with the Embodiment 1.
Figure 6:
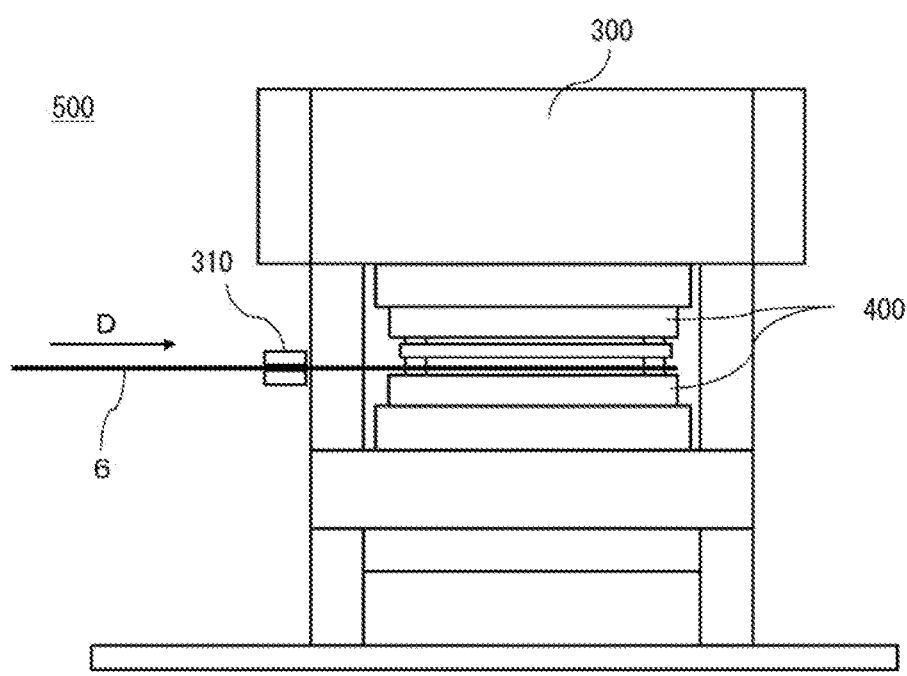
FIG. 6 is a schematic illustration which shows a manufacturing apparatus of the core element in accordance with the Embodiment 1.

With reference to the flow chart of FIG. 5, explanation will be made about the flow of the punch cutting out process in FIG. 4, which is in accordance with the movement of an electromagnetic steel sheet 6. In the first punch cutting out process of the step S10, two spots of punch cut out traces 611 and 612 which are shown in hatching are produced as first core elements 20, by punch cutting out of the electromagnetic steel sheet 6, which is fed in with the feeding device 310. As for the punch cutting out direction, a back yoke portion 21 is set at an upstream side of the feeding direction D, and a teeth portion 22 is set at a downstream side of the feeding direction D. After the punch cutting out is conducted, the electromagnetic steel sheet 6 is fed by just a length P, an equivalent of one pitch. The length P of one pitch is the sum of a product dimension W of the feeding direction of a core element 20 which is a product, and a margin width X, which becomes an interval of the feeding direction of a punch cut out trace. Next, the electromagnetic steel sheet 6 is fed in the step S15, as idle feeding, further by just a length P, an equivalent of one pitch.

In the step S20, positioning is conducted as a second punch cutting out process, using punch cut out trace shapes of the fed punch cut out traces 611 and 612, which are produced previously by punch cutting out in the first punch cutting out process. In the positioning, product shaped pilots 71a and 71b are used to the punch cut out trace 611, and product shaped pilots 72a and 72b are used to the punch cut out trace 612. In a state where the positioning is performed, two spots of punch cut out traces 621 and 622 which are shown in hatching are produced as second core elements 20 by punch cutting out. As for the punch cutting out direction, the back yoke portion 21 is set at an upstream side of the feeding direction D, like in the step S10. After the punch cutting out is conducted, the electromagnetic steel sheet 6 is fed by just a length P, an equivalent of one pitch. In the step S25, the electromagnetic steel sheet 6 is fed, as idle feeding, further by just a length P, an equivalent of one pitch.

Since same operations in the step S20 and the step S25 are repeated in the steps S30, S35, S40, S45 and S55, which correspond to subsequent processes, detailed explanation is omitted. In the step S30, two spots of punch cut out traces 631 and 632 which are shown in hatching are produced as third core elements 20 by punch cutting out. However, as is shown by the punch cut out traces 631 and 632, the punch cutting out direction of the core element 20 is set at an opposite direction of the step S10 and the step S20, that is, the punch cutting out direction is set so that the back yoke portion 21 may face toward a downstream of the feeding direction D. In the step S40, two spots of punch cut out traces 641 and 642 which are shown in hatching are produced as fourth core elements 20 by punch cutting out. The punch cutting out direction here is the same as that of the step S30. In the step S50, two spots of punch cut out traces 651 and 652 which are shown in hatching are produced as fifth core elements 20 by punch cutting out. The punch cutting out direction here is the same as that of the step S10.

Next, in the step S60, two spots of punch cut out traces 661 and 662 which are shown in hatching are produced as sixth core elements 20 by punch cutting out. The punch cutting out direction here is the same as that of the step S10. After the punch cutting out is conducted, the electromagnetic steel sheet 6 is fed by just a length P, an equivalent of one pitch. According to the processes mentioned above, while a state is maintained in which punch cut out trace shapes, which are produced by punch cutting out of the core element 20, are lined in a zigzag direction, toward the widthwise direction of an electromagnetic steel sheet 6, a state is established in which punch cutting out is conducted in a whole area, leaving only a margin width Y of the widthwise direction. In the last step S70 or in a scrap cut process, scrap cutting of these marginal parts is conducted at a domain shown in a cut portion 8.

As is described above, punch cutting out of the core element 20 with dies conducted in a series of steps produces two elements having a product shape, in each of the first to sixth punch cutting out processes. Thereby, a bunch of products, consisting of twelve core elements, can be produced by conducting a single punch cutting out with a press mechanism. These processes are performed simultaneously in parallel, on the inside of the manufacturing apparatus 500, which is used as a press mechanism. Then, every time the electromagnetic steel sheet 6 is fed by one pitch, a bunch of twelve core elements 20 can be produced at the same time.

The feeding pitch P of an electromagnetic steel sheet 6 is set as the sum of a product dimension W and a margin width X, and utilization of the material is achieved by disposing a plurality of core elements 20 in a parallel arrangement or in a zig zag arrangement. Further, regarding the punch cutting out of the core element 20, a whole punch cutting out is employed, where a single punch cutting out can constitute a product shape. Thereby, the direction of shearing work becomes uniform, and the necessity of matching cut is eliminated, and then, improvement of the dimensional accuracy in the product punch cutting out can be attained. Further, simple constitution of dies can be attained and there arise effects to improve the accuracy of product dimension and to increase the productivity, including the reduction of die cost and others. It is to be noted that, it is also possible to attain a configuration in which punch cutting out is conducted at a plurality of spots of more than two, in each of the punch cutting out processes, and then, further improvement of the productivity can be attained.

Figure 7:
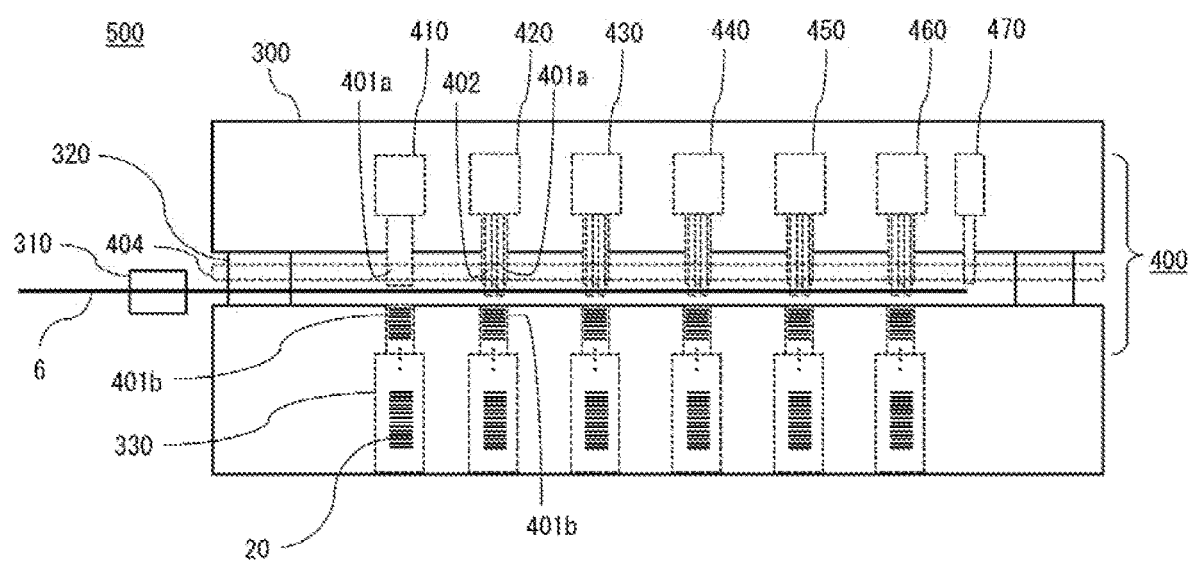
FIG. 7 is a side view which shows the manufacturing apparatus of the core element in accordance with the Embodiment 1.

Next, with reference to FIG. 7, explanation will be made about the manufacturing apparatus 500 of the core element 20. FIG. 7 shows a side view of the manufacturing apparatus 500 of the core element, which employs a press device 300 (including an uncoiler but not shown in the figure) and a die device 400. With the help of guide posts 320, the die device 400 is supported by the press device 300. Further, the die device 400 includes a first punch cutting out portion 410 for performing the step S10 of the first punch cutting out process, and a second punch cutting out portion 420 for performing the step S20 of the second punch cutting out process. Further, the die device 400 is provided with respective punch cutting out portions, including the third punch cutting out portion 430 for performing the step S30 of the third punch cutting out process, to the sixth punch cutting out portion 460 for performing the step S60 of the sixth punch cutting out process. Further, the die device 400 is provided with a scrap cut portion 470 for performing finally a scrap cut in the step S70 of the scrap cut process.

In each of the first punch cutting out portion 410 to the sixth punch cutting out portion 460, for punch cutting out the core element 20, a punch cutting die 401a and a punch receptive die 401b are provided. Core elements 20 which are punch cut out in each of the processes will be ejected in a core element outlet portion 330. Further, product shaped pilots 402 for positioning at the time of punch cutting out are disposed in the second punch cutting out portion 420 to the sixth punch cutting out portion 460. The die 401 for punch cutting out the core element 20 has a punch cutting die 401a which is an upper die, and a punch receptive die 401b which is a lower die. Both the punch cutting die and the punch receptive die are disposed in each of the two spots which constitute the punch cutting domain of respective punch cutting out portions. Further, in the die device 400, there is provided a stripper plate 404 for striping off, from the die 401, a core element 20 which is produced by punch cutting out. Here, the product shaped pilot 402, actually, the product shaped pilot which is used in the second punch cutting out portion 420 is divided in four and disposed, as shown in FIG. 4. The configuration made of those four parts is in accordance with respective punch cut out trace shapes of a back yoke portion and a teeth portion of the punch cut out traces 621 and 622 of the core element 20. Further, also in the third punch cutting out portion 430 to the sixth the punch cutting out portion 460, four parts of the product shaped pilot are similarly disposed. From now on, when treated as a part of the die device 400, the product shaped pilot is totally referred to as product shaped pilot 402. In contrast, when used for positioning on an electromagnetic steel sheet 6, the product shaped pilot is indicated as product shaped pilots 71a, 71b, 72a, and 72b, using an individual code which is assigned to each of the four.

Next, the movement of the manufacturing apparatus 500 will be explained with reference to FIG. 7. First, a belt like electromagnetic steel sheet 6 is fed sequentially to the inside of the die device 400, by the use of the feeding device 310. In the first punch cutting out portion 410, the step S10 of the first punch cutting out process is performed, where punch cutting out of the first core element 20 is conducted with a first die 401 (a punch cutting die 401a and a punch receptive die 401b). Thereby, punch cut out traces 611 and 612 are formed. In the second punch cutting out portion 420, the step S20 of the second punch cutting out process is performed, where positioning is conducted using a product shaped pilot 402 which is disposed at a punch cut out trace which is previously punch cut out, and a second core element 20 is produced by punch cutting out with a second die 401 (a punch cutting die 401a and a punch receptive die 401b). In the third punch cutting out portion 430 to the sixth punch cutting out portion 460, positioning with the product shaped pilot 402 and punch cutting out with the die 401 are conducted as the step S30 of the third punch cutting out process to the step S60 of the sixth punch cutting out process, through the same operations of the second punch cutting out portion 420. Further, the step S70 of the scrap cut process is performed in the scrap cut portion 470, where the scrap of the electromagnetic steel sheet 6 is cut out, on which punch cutting out is already conducted until the step S60 of the sixth punch cutting out process.

In the present embodiment, dies 401 are disposed so that two spot punch cutting out can be conducted at the same time, in the first punch cutting out portion 410 to the sixth punch cutting out portion 460. Therefore, a single punch cutting out operation of the press device 300 can produce core elements 20 at twelve spots, at the same time. Further, the present embodiment is configured to employ two as the number of punch cutting out elements in respective punch cutting out portions of the core element 20, and six as the number of punch cutting out portions. However, similar configuration can be constructed to work, by using, for positioning, a punch cut out trace of the core element 20, which is previously punch cut out in a previous step, even when the number of punch cutting out elements and the number of punch cutting out portions are increased.

Further, since the product shaped pilot 402 is used, the load of punch cutting out can be equalized, and the tilt of a die 401 is reduced. Thereby, since the clearance between a punch cutting die 401a and a punch receptive die 401b is stabilized, improved accuracy of punch cutting out is achieved. Further, since displacement corresponding a positioning gap at the time of feeding does not occur, the present embodiment has an effect to improve the accuracy of the product shape.

Further, since punch cutting out configuration produced by punch cutting out and the constitution of the die 401 are identical at each of the punch cutting out portions, press load is hard to gain a deflection. In particular, when a sheet material of 0.3 mm thick or less is used, a limit size of the clearance becomes small (6% of the board thickness, that is, 0.018 mm). Thereby, the equalization in such a press load becomes effective. The present embodiment has effects to stabilize the punch cutting out with a die and to improve the accuracy of a product shape.

Figure 8:
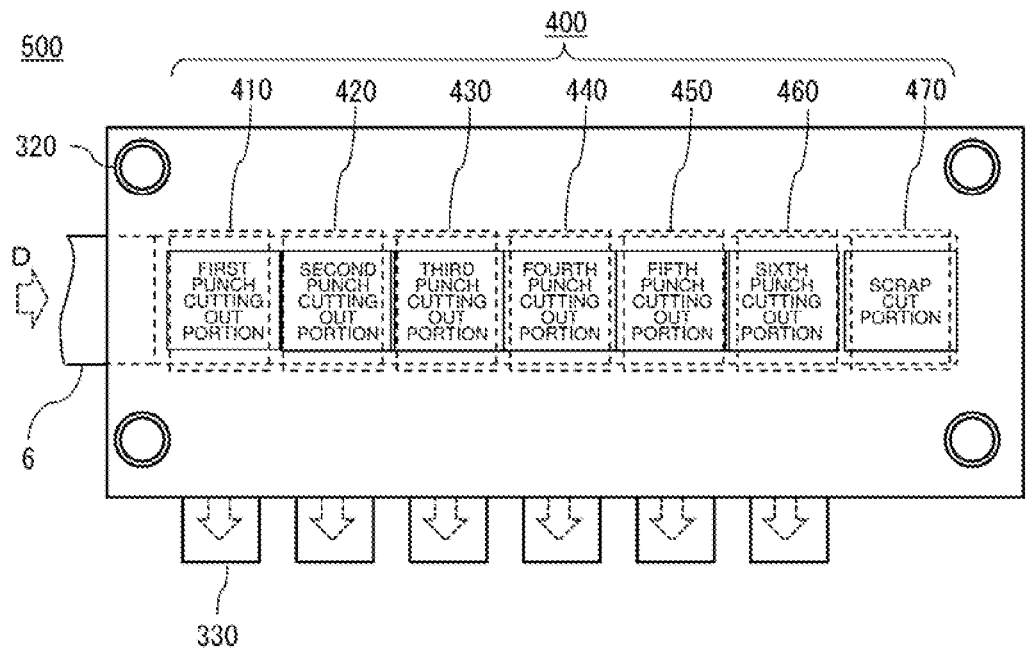
FIG. 8 is a plane view which shows the manufacturing apparatus of the core element in accordance with the Embodiment 1.

FIG. 8 shows a plane view of the manufacturing apparatus 500. Core elements 20, which are punch cut out in the first punch cutting out portion 410 to the sixth punch cutting out portion 460 of the die device 400, will be collected in their respective punch cutting out portions, and will be ejected in the core element outlet portion 330. The ejected core elements 20 will be collected by a transport system, such as a belt conveyor.

Figure 9A:
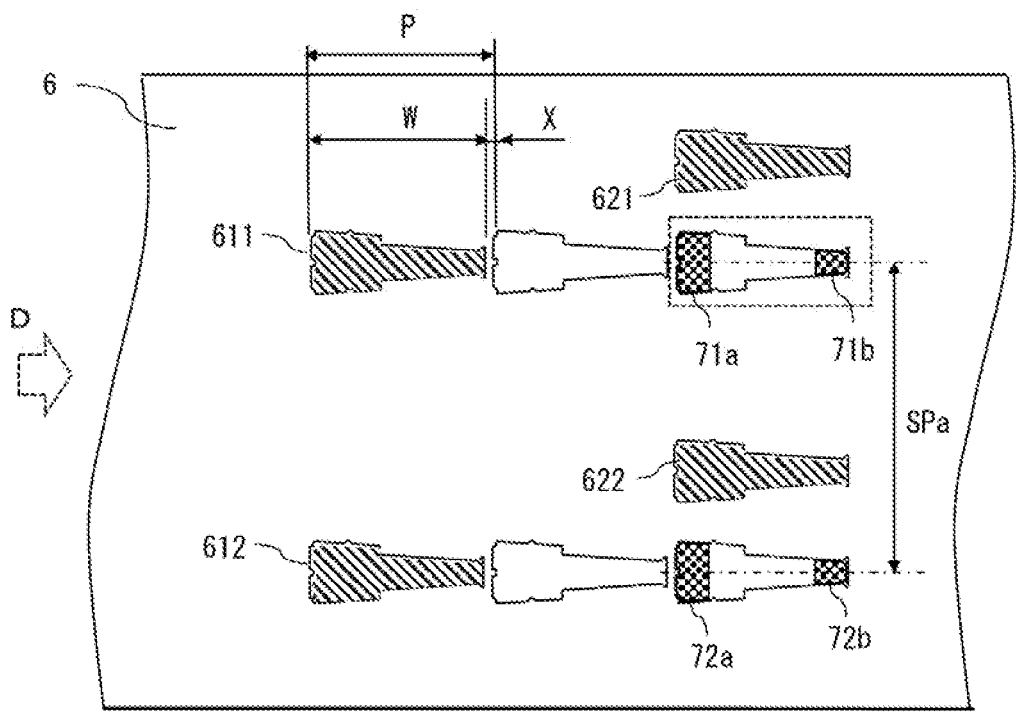
FIG. 9A is a plane view of an electromagnetic steel sheet, for explaining the method for manufacturing the core element in accordance with the Embodiment 1.

On a belt like electromagnetic steel sheet 6 which is shown in FIG. 4 and FIG. 9A, a large number of punch cut out traces of the core element 20 are arranged. The domain on which punch cutting out is conducted with a punch cutting die 401a and a punch receptive die 401b is disposed so that the domain can be sandwiched with at least one or more spots by product shaped pilots 71a, 71b, 72a, and 72b, which are arranged in a direction orthogonal to a feeding direction D. The punch cut out trace 622 of the second core element 20, which is punch cut out in the step S20 of the second punch cutting out process, is disposed in a range SPa, which is sandwiched between the product shaped pilots 71a and 71b by the punch cut out trace 611 of the first core element 20 and the product shaped pilots 72a and 72b by the punch cut out trace 612. As a result, it becomes possible to stabilize a margin width X of the electromagnetic steel sheet 6 at the time of forward feeding, and the present embodiment has an effect to stabilize the speed up of punch cutting out.

Figure 9B:
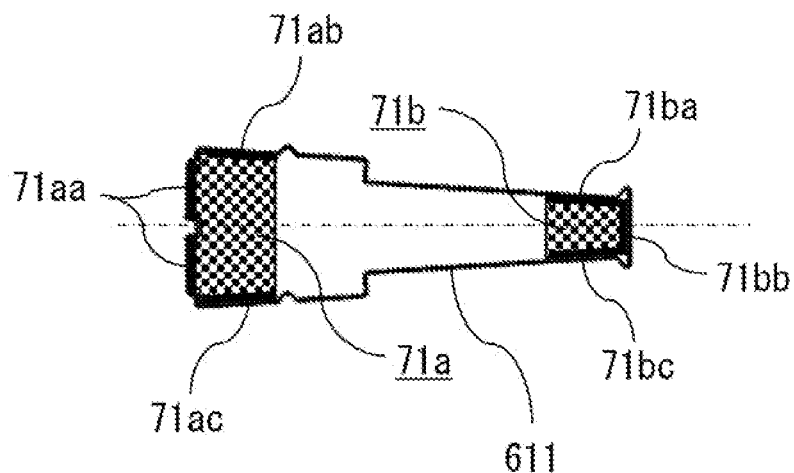
FIG. 9B is an enlarged view which shows a product shaped pilot in accordance with the Embodiment 1.

With reference to FIG. 9A, explanation will be made about the details and constitution of a product shaped pilot 402 for positioning an electromagnetic steel sheet 6. Because a punch cut out trace which is produced by punch cutting out of the core element 20 is not of a circle hole shape, positioning cannot be performed with only a pilot pin of general use. Then, in the present embodiment, a product shaped pilot 402 having the same configuration with a part of the product shape is divided, and those divided parts are disposed in both the back yoke portion 21 and the teeth portion 22, within the punch cutting out domain of a product shape. In the punch cut out trace 611, product shaped pilots 71a and 71b are employed to perform positioning. FIG. 9B shows an enlarged view of the product shaped pilots 71a and 71b, which are disposed in this punch cut out trace 611. The punch cut out trace 611 is the one which is produced to have a product shape, by punch cutting out with the punch cutting die 401a and the punch receptive die 401b of the core element 20. The cut edge of the punch cut out trace has property as a shearing work surface. The shearing work surface maintains the exact external shape and the exact dimension of the punch cutting die 401a, and use of this shearing surface makes it possible to perform positioning with a high accuracy. As shown in FIG. 9B, the product shaped pilot 71a performs positioning, using three facets of shearing work surfaces 71aa, 71ab, and 71ac. Further, the product shaped pilot 71b performs positioning, using three facets of shearing work surfaces 71ba, 71bb, and 71bc.

As for the punch cut punch cut out trace 612, positioning is performed in a similar manner, using product shaped pilots 72a and 72b. In this way, four spots of the punch cut out trace shapes can be used. When three or more facets of the shearing work surface of a punch cut out trace are employed, positioning of an electromagnetic steel sheet 6 can be performed. Therefore, in the present embodiment, positioning using twelve facets, namely, the total of three facets by four spots, of the shearing work surface can be performed, and positioning with a higher accuracy can be achieved.

Further, when a dovetail groove portion 23 at the external diameter side of a back yoke portion 21 is used as the shape of product shaped pilots 71a and 72a at the back yoke portion 21 side, the present embodiment has an effect to improve the positioning accuracy of the steel sheet. Thereby, margin width X can be reduced and press high speed punch cutting out can be performed. Further, because the shape of a product shaped pilot 402 can be constructed to fit a product shape, a requisite minimum of shape and dimension can be constructed, and the flexibility in the design time of the product shaped pilot 402 is also improved. Further, when the product punch cutting out domain of the core element 20 as well as the product shape are used, it becomes unnecessary to provide a hole opening step for the pilot, such as a pilot pin, and the necessity to provide the scrap except a feeding margin can be eliminated. Further, the present embodiment has an effect to reduce the number of die parts and to restrain the size of dies. As a result, it becomes possible to secure the dimensional accuracy in the product punch cutting, to conduct a high speed punch cutting out by press, and to improve a material yield rate, by a drastic reduction in the coil material width.

As mentioned above, the method for manufacturing the core element, in accordance with the Embodiment 1, is designed to conduct a step S10 in a first punch cutting out process, for punch cutting out a first core element 20 having a product shape, from a belt like electromagnetic steel sheet 6, with a manufacturing apparatus 500, which is a press mechanism which has a feeding device 310 of the electromagnetic steel sheet 6, a feeding process for feeding the electromagnetic steel sheet 6, with the feeding device 310, and a step S20 in a second punch cutting out process, for positioning with a product shaped pilot 402 which is in compliance with an external shape of the core element 20, using a punch cut out trace shape of the first core element 20, and producing a second core element 20 having the product shape, by punch cutting out with the manufacturing apparatus 500, which is a press mechanism.

According to the method for manufacturing the core element 20 which is described here, punch cutting out is conducted so that an exact product shape of the core element 20 can be produced, and then, the dimensional accuracy of the product can be raised. Further, since the punch cut out trace of a product shape is used for positioning in the punch cutting out of a core element 20, there is no need to provide an extra scrap, except the product and a die. Accordingly, high speed punch cutting out can be conducted without reducing a material yield rate.

Embodiment 2

Figure 10:
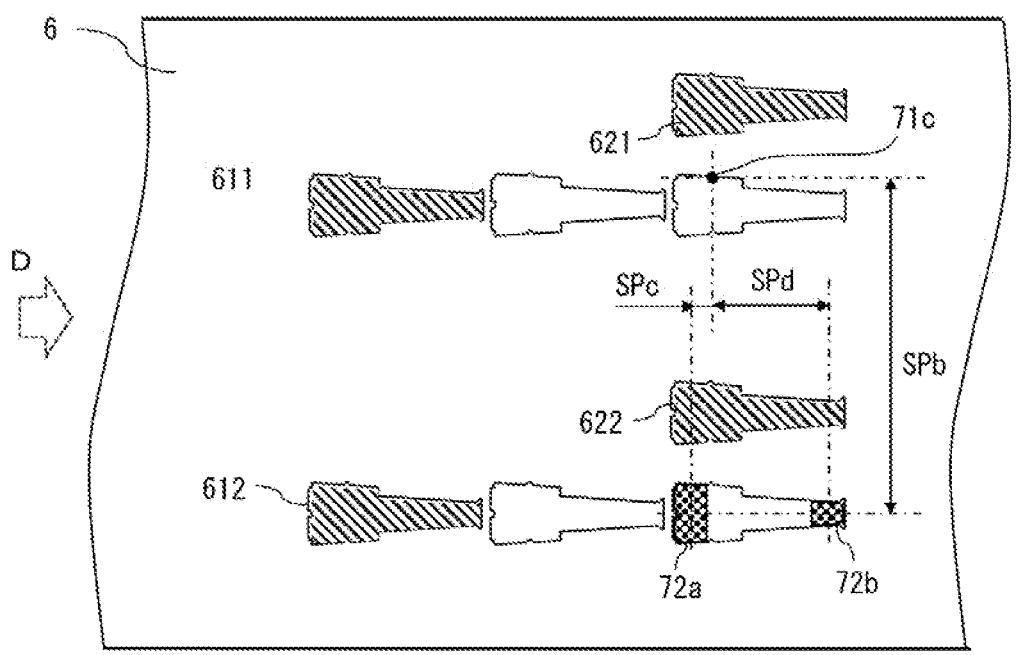
FIG. 10 is a plane view of an electromagnetic steel sheet, for explaining a method for manufacturing a core element in accordance with Embodiment 2.

Embodiment 2 is a partially modified variation of the Embodiment 1, and the modified points will be explained. FIG. 10 shows a plane view of an electromagnetic steel sheet 6 in accordance with the Embodiment 2. In the Embodiment 1, product shaped pilots 71a, 71b, 72a, and 72b alone are used to conduct positioning of the feeding direction. In the present embodiment, the constitution which is combined with a pilot pin 71c will be explained. The core elements are divided in a circumferential direction, and most of them are provided with a core positioning convex portion 24a and a core positioning concave portion 24b. Those portions will be used as a convex portion and a concave portion, when core elements are assembled and circularly arranged, in a circumferential direction and a radial direction. Therefore, as means to secure the positioning accuracy and to facilitate a die device, a pilot pin 71c is disposed in the core positioning concave portion 24b of the punch cutting out domain of a core element. The pilot pin 71c, when combined with product shaped pilots 72a and 72b, can be used for positioning of an electromagnetic steel sheet 6, from which a second core element 20 is punch cut out.

Thereby, the constitutional method of the die device 400 can be increased, and the flexibility of die layout is increased. Further, when punch cutting out process proceeds to a later process, only margin width X is left on the electromagnetic steel sheet 6 and the stiffness of the steel sheet is reduced. Thereby, when a pilot pin 71c and product shaped pilots 72a and 72b are combined, it becomes possible to secure the positioning accuracy of the electromagnetic steel sheet 6 and to attain the simplification of the die device 400. Further, high speed punch cutting out can be achieved by simplifying the constitution of dies.

Further, also in this case, it is effective for the stabilization of punch cutting out to dispose the punch cut out trace 622 of a second core element 20 in a range SPb, where the second core element is punch cut out in the step S20 of the second punch cutting out process. The range SPb is sandwiched between product shaped pilots 72a and 72b by the punch cut out trace 612 of the first core element 20 and a pilot pin 71c by the core positioning concave portion 24b of the punch cut out trace 611. Further, toward the feeding direction, the pilot pin 71c has a position interval SPc of the feeding direction D with a product shaped pilot 72a, and a position interval SPd of the feeding direction D with a product shaped pilot 72b. Then, stable positioning with three spots can be achieved.

Embodiment 3

Figure 11:
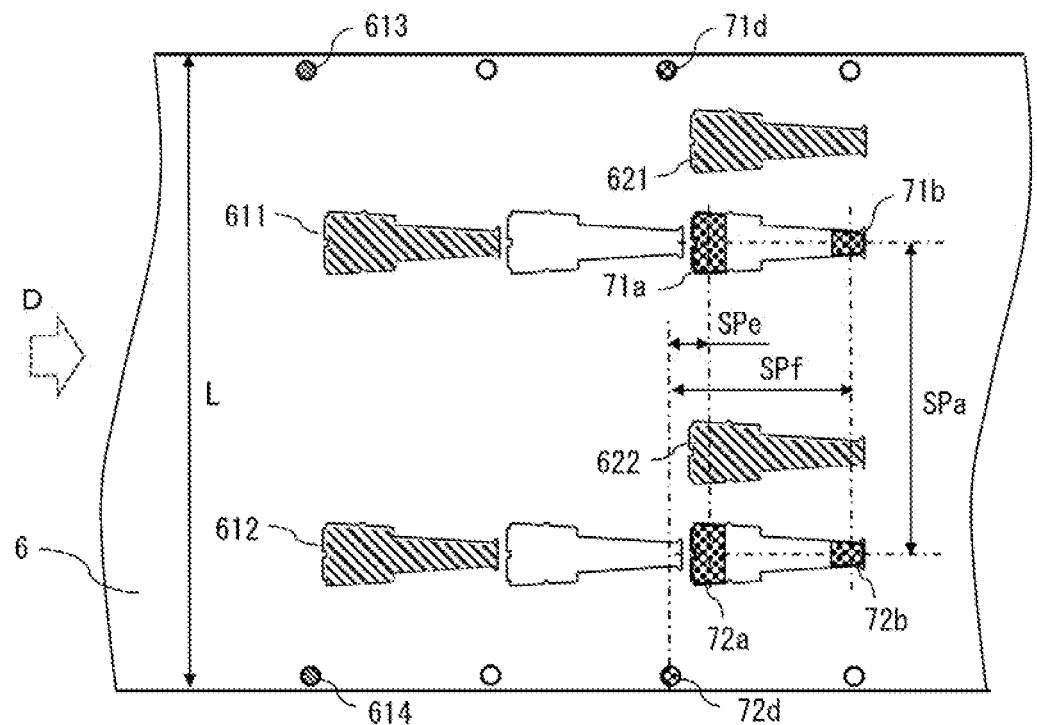
FIG. 11 is a plane view of an electromagnetic steel sheet, for explaining a method for manufacturing a core element in accordance with Embodiment 3.

Embodiment 3 is another partially modified variation of the Embodiment 1, and the modified points will be explained. FIG. 11 shows a plane view of an electromagnetic steel sheet 6 in accordance with the Embodiment 3. In the present embodiment, at the same time with the step S10 of the first punch cutting out process, which is an initial punch cutting out process, punch cutting out of pilot holes 613 and 614 for pilot pins, is conducted at two spots which are disposed in a direction orthogonal to a steel sheet feeding direction D and also at both ends. The both ends of a steel sheet is regarded as an invalid domain in which products are not available, and then, a pilot hole can be disposed, without reducing a material yield rate. Further, the configuration of pilots shown in FIG. 11, except those at both ends, consists of product shaped pilots 402, which are identical with those of the Embodiment 1. Further, the central axe of pilot pins 71d and 72d at both ends is disposed at the position with displacements from a central axe of product shaped pilots 71a and 72a and a central location of product shaped pilots 71b and 72b, toward the feeding direction D by just a position interval SPe and a position interval SPf, respectively. As a result, in addition to the positioning of product shaped pilots 71a, 71b, 72a, and 72b, in accordance with the Embodiment 1, positioning by pilot pins 71d and 72d at both ends, in accordance with the present embodiment, becomes available. Therefore, positioning accuracy is further improved, and margin width X can be stabilized. Thereby, the accuracy of punch cutting out can be improved, and punch cutting out by high speed press can be achieved.

Embodiment 4

Figure 12:
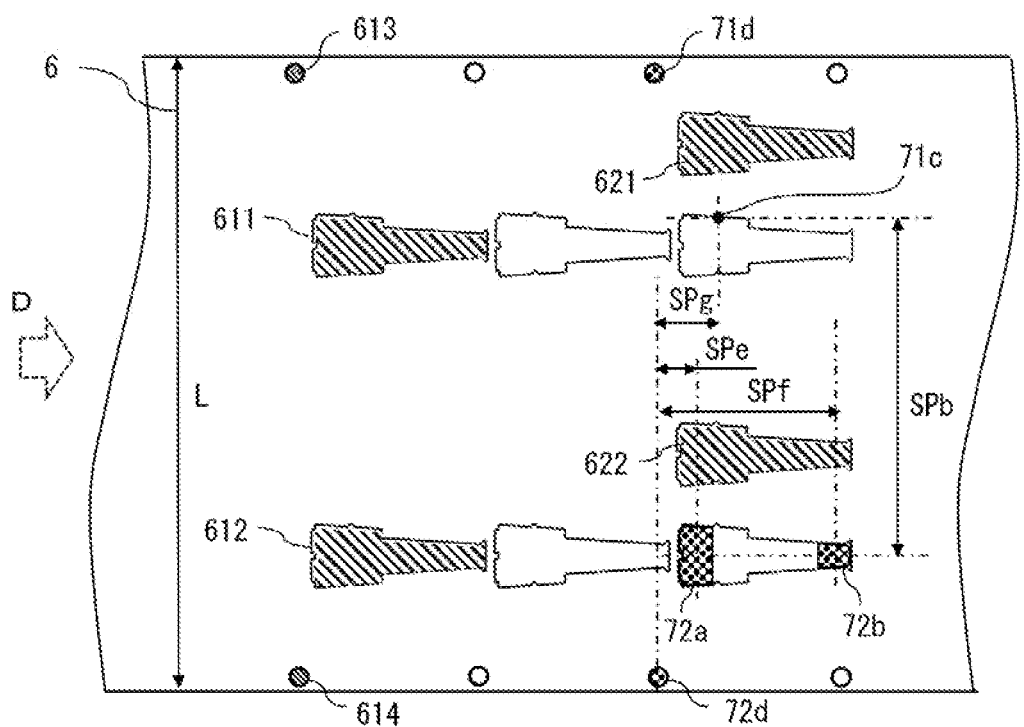
FIG. 12 is a plane view of an electromagnetic steel sheet, for explaining a method for manufacturing a core element in accordance with Embodiment 4.

Embodiment 4 deals with a case in which the Embodiment 2 and the Embodiment 3 are combined. FIG. 12 shows a plane view of an electromagnetic steel sheet 6 in accordance with the Embodiment 4. In the present embodiment, a pilot pin 71c and pilot pins 71d and 72d are used. The pilot pin 71c uses a product shaped pilot 402 and a core positioning concave portion 24b which is a radial direction positioning portion of a product shape. The pilot pins 71d and 72d are disposed at the both ends of an electromagnetic steel sheet 6. At this time, the central axe of the pilot pins 71d and 72d, disposed at the both ends of the electromagnetic steel sheet 6, is disposed at a position with a displacement from a pilot pin 71c which uses the core positioning concave portion 24b, toward the feeding direction D by just a position interval SPg. As a result, in addition to the positioning according to the Embodiment 2 in which the product shaped pilots 72a and 72b and the pilot pin 71c are combined, positioning according to the Embodiment 3, which is conducted by the pilot pins 71d and 72d of both ends, is available. Therefore, even when the material width of a belt like electromagnetic steel sheet is increased, the positioning accuracy of a coil material is further improved and margin width X can be stabilized. As a result, the displacement and vibration at the time of punch cutting out can be restrained, and punch cutting dimension with a higher accuracy can be attained. Further, it become possible to attain an ultra high speed up of the punch cutting out by press, and then, improved productivity can be achieved.

Embodiment 5

Figure 13:
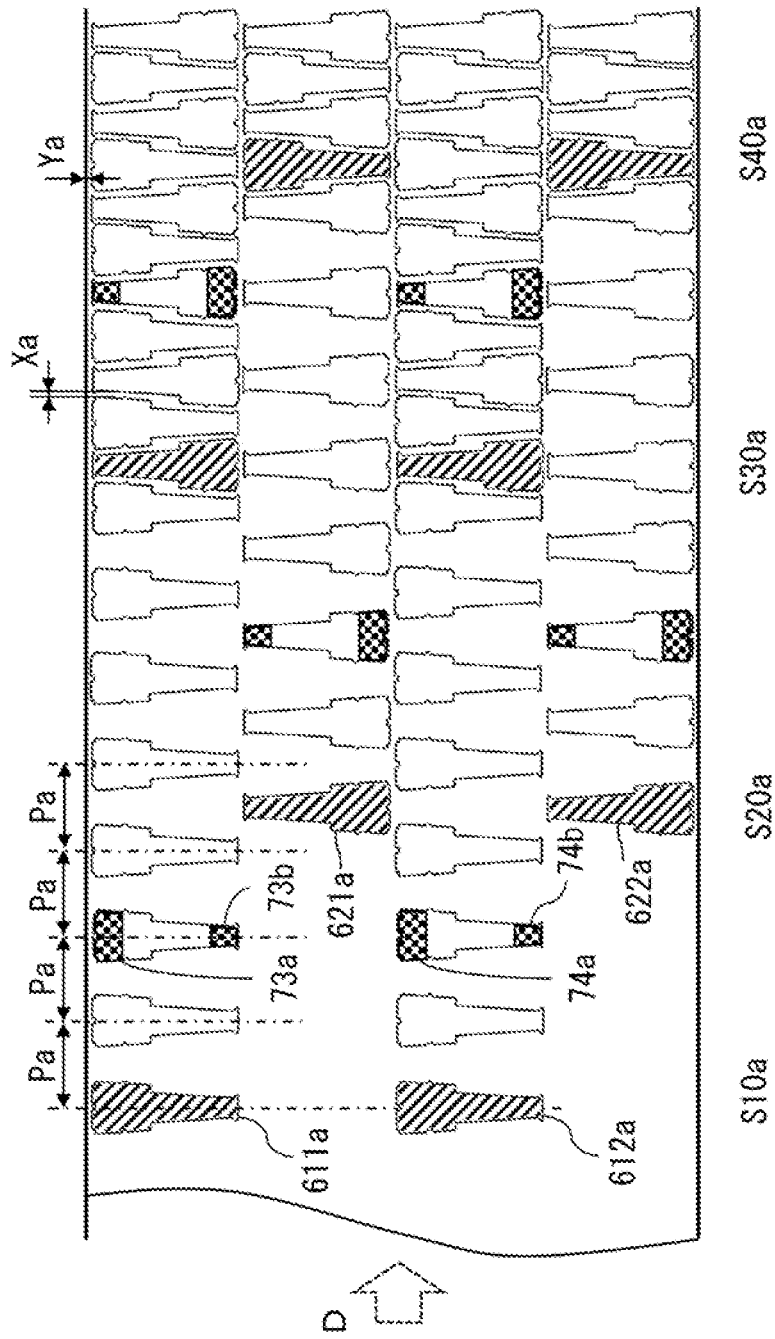
FIG. 13 is a plane view of an electromagnetic steel sheet, for explaining a method for manufacturing a core element in accordance with Embodiment 5.

Embodiment 5 is another partially modified variation of the Embodiment 1, and the modified points will be explained. FIG. 13 is the one which shows a plane view of an electromagnetic steel sheet 6 in accordance with the present embodiment. On the electromagnetic steel sheet 6 of FIG. 13, the punch cutting out direction of a core element 20 is different from that of the Embodiment 1. That is to say, the direction of punch cut out traces 611a, 612a, 621a, and 622a of the core element 20 is arranged so that the back yoke portion 21 or the teeth portion 22 can face a direction perpendicular to the feeding direction D of the electromagnetic steel sheet 6. Further, product shaped pilots 73a, 73b, 74a, and 74b are also disposed at a position which is in compliance with punch cut out trace shapes. In FIG. 13, punch cut out trace shapes of the core element are arranged in four rows so that the arrangement may become a zigzag manner, toward the feeding direction of the electromagnetic steel sheet 6. In regard to the punch cutting out process, there are provided four steps of the steps S10a, S20a, S30a, and S40a, and a feeding pitch Pa of the electromagnetic steel sheet 6 can be made smaller depending on the shape of a core element 20. When compared with the cases of FIG. 4 and FIG. 9, it is found that the pitch Pa can be made considerably smaller than the pitch P, even if the margin width Xa is the same with the margin width X. Further, even in a case where an electromagnetic steel sheet 6 with a larger width is employed and core elements 20 are arranged in multiple rows of four rows and more, a similar manufacturing method can be available.

In the present embodiment, because a smaller pitch Pa of the forward feeding direction can be employed, a full length of the die can be reduced, and press punch cutting out at a higher speed can be achieved. Further, the present embodiment has an effect to reduce the size of a press device 300 and a manufacturing apparatus 500, owing to the downsizing of a die device 400. Further, if the present embodiment is configured to employ only product shaped pilots 73a, 73b, 74a, and 74b, there is no need to provide a pilot pin, as well as in the Embodiment 1, and then, material yield rate can be improved.

Embodiment 6

Figure 14:
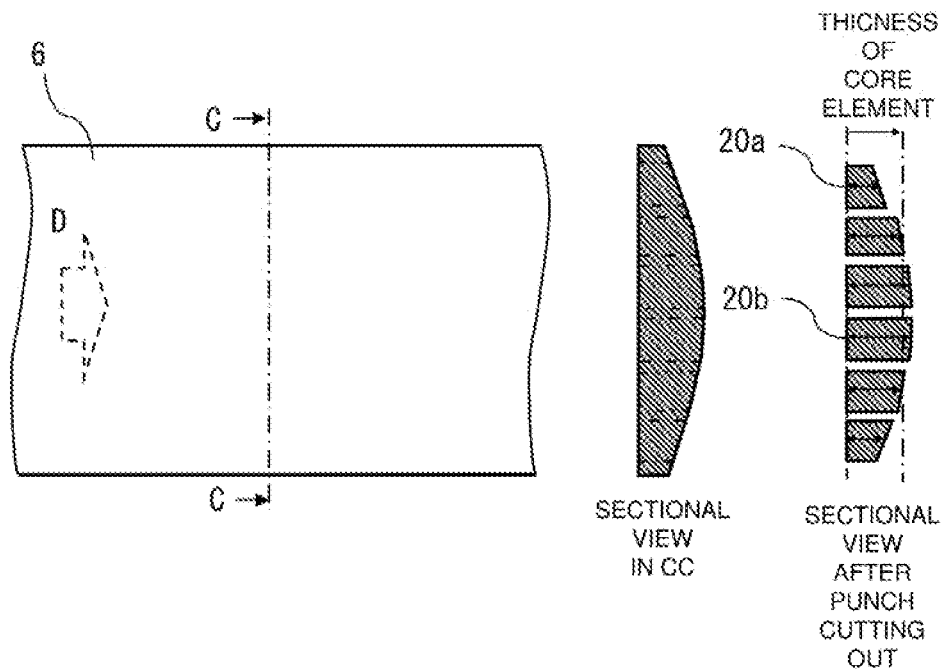
FIG. 14 is a schematic block diagram which shows the feature of an electromagnetic steel sheet in accordance with Embodiment 6.

Embodiment 6 is the one which shows a method for manufacturing a divisional layer stack core which is made of layer stacked core elements 20. FIG. 14 is a schematic diagram for explaining a board thickness deviation, as a feature of an electromagnetic steel sheet 6. As shown in FIG. 14, the section CC of a widthwise direction, which is perpendicular to the feeding direction D of an electromagnetic steel sheet 6, has a 'kamaboko' configuration where the central part becomes somewhat larger in thickness. Since the drawing is drawn with exaggeration, the section has an actual difference of several tens of microns or less. In the example shown in FIG. 14, core elements 20 are produced by punch cutting out, and are arranged side by side in six rows, which are perpendicular to the feeding direction D of an electromagnetic steel sheet 6. Therefore, the difference in thickness occurs in those produced core elements 20, according to their respective rows. For example, a core element which is punch cut out at the edge of the electromagnetic steel sheet 6 will be referred to as a core element 20a, and a core element which is punch cut out at a central row will be referred to as a core element 20b.

Figure 15A:
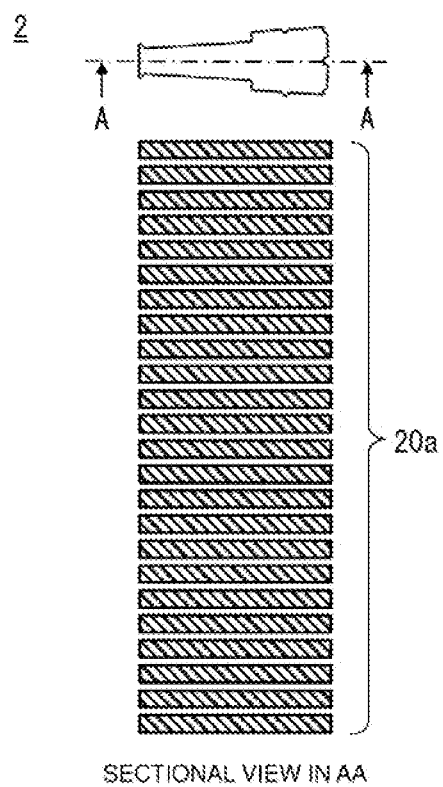
FIG. 15A is a sectional view which shows a divisional layer stack core in accordance with the Embodiment 6.

As shown in FIG. 15A, the thickness deviation of a divisional layer stack core 2, consisting of the same core elements 20a which are collected exclusively and layer stacked, is amplified even by the number of layer stacking of the core element 20a. Therefore, a difference can be found in the whole dimension of a divisional layer stack core 2, among the ones which are made by layer stacking of other sites. Those divisional layer stack cores include, for example, a divisional layer stack core, made by layer stacking exclusively core elements 20b. Further, there arises a problem that a divisional layer stack core tilts, at a layer stacking stage.

Figure 15B:
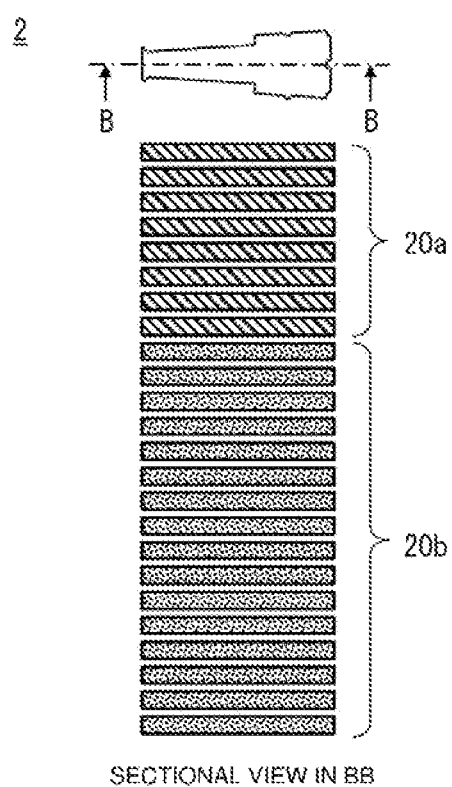
FIG. 15B is a sectional view which shows a divisional layer stack core in accordance with the Embodiment 6.

In order to solve such a problem, the site of a core element 20 which is produced by punch cutting out is controlled based on the punch cutting out row, to obtain a divisional layer stack core 2 which is shown in the present embodiment. At the stage of layer stacking of a core element 20, core elements from a plurality of rows are combined and layer stacked, to reduce errors. FIG. 15B shows the example. In FIG. 15B, a core element 20a with a small board thickness and a core element 20b with a large board thickness are combined, and thereby, it becomes possible to reduce the influence of the board thickness deviation of post layer stacking.

Further, it is worthy to focus on the punch cutting out position which is shown in FIG. 4. The punch cut out traces of the core element 20 at every two spots are combined in respective processes of the first punch cutting out process to the sixth punch cutting out process, so that the board thickness deviation of an electromagnetic steel sheet 6 can be reduced. Therefore, core element outlet portions 330, in which core elements produced by punch cutting out in the respective processes are ejected, are controlled according to the punch cutting out process, and those core elements are combined. Thereby, the influence of board thickness deviation is decreased and dimension errors can be reduced.

As described above, core elements 20, which are punch cut out from an electromagnetic steel sheet 6, on a plurality of rows which are arranged in the feeding direction D, are controlled according to their respective rows. Core elements 20 from two or more different rows will be layer stacked according to the combination, which reduces the dimension error by the board thickness deviation of the widthwise direction of an electromagnetic steel sheet 6. By so doing, the divisional layer stack core 2 can gain a lesser influence of the board thickness deviation of post layer stacking, and reduction of dimension error can be achieved. Further, the above described process makes it possible to secure the dimensional accuracy of a stator core 3, at the time when divisional layer stack cores 2 are assembled in a circular manner, and then, improved productivity can be achieved.

It is to be noted that, in the Embodiment 1 to the Embodiment 5, shown are the manufacturing methods which include only processes for punch cutting out a core element 20. However, it is allowed to provide a swage forming portion for fixing gaps between stacked layers, before and after the punch cutting out processes.

Further, in each of the above described embodiments, explanation is made on exemplary cases which are applied to the core element 20 for a stator core 3. However, for example, in a rotary electric machine 100 which includes a coil wound on the rotor 4 side, those embodiments can be applied also to a divisional layer stack core constructing the rotor 4, where the divisional layer stack core has a back yoke portion and a teeth portion; and a method and apparatus for manufacturing the same.

Although the present application is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present application. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A method for manufacturing core elements, for use in a divisional layer stack core of a rotary electric machine, by using a press mechanism that includes a feeding device configured to feed an electromagnetic steel sheet that has a shape of a belt, the method comprising:
    performing a first punch cutting out process that comprises punch cutting out, from the electromagnetic steel sheet and with the press mechanism, a first core element having a core element shape;
    performing a feeding process after the first punch cutting out process, the feeding process comprising feeding the electromagnetic steel sheet with the feeding device; and
    performing a second punch cutting out process after the feeding process, the second punch cutting out process comprising:
        positioning the electromagnetic steel sheet by using core element shaped pilot, which has an external shape of the first core element, with respect to a punch cut out trace shape of the first core element; and
        producing a second core element having the core element shape from the electromagnetic steel sheet, by punch cutting out with the press mechanism.

2. The method for manufacturing the core elements as claimed in claim 1, wherein
    the positioning of the second punch cutting out process comprises contacting three or more facets of the punch cut out trace shape of the first core element with the external shape of the core element shaped pilot.

3. The method for manufacturing the core elements as claimed in claim 1, wherein
    the first punch cutting out process comprises punch cutting out, with the press mechanism, a plurality of first core elements, including the first core element, from the electromagnetic steel sheet, and
    the performing of the second punch cutting out process comprises punch cutting out, with the press mechanism, a plurality of second core elements, including the second core element, from the electromagnetic steel sheet.

4. The method for manufacturing the core elements as claimed in claim 3,
    wherein the punch cutting out of the plurality of second core elements comprises punch cutting out a least one of the plurality of second core elements while the at least one of the plurality of second core elements is disposed at a position that is sandwiched between two or more core element shaped pilots that are respectively within punch cut out trace shapes of two or more of the plurality of first core elements.

5. The method for manufacturing the core elements as claimed in claim 1, further comprising:
    performing an additional feeding process that comprises feeding the electromagnetic steel sheet with the feeding device; and
    performing a third punch cutting out process that comprises:
        positioning the electromagnetic steel sheet by using an additional core element shaped pilot, which has an external shape of the second core element, with respect to a punch cut out trace shape of the second core element; and
        producing a third core element having the core element shape from the electromagnetic steel sheet, by punch cutting out with the press mechanism.

6. The method for manufacturing the core elements as claimed in claim 5, wherein
    each of the core elements includes a sector shape, that includes:
        a back yoke portion that is configured to be in contact with an external diameter side of the rotary electric machine; and
        a teeth portion configured to protrude to an internal diameter side of the rotary electric machine from the back yoke portion, and
    the core element shaped pilot includes:
        a first portion that has an external shape of the back yoke portion; and
        a second portion that is separate from the first portion and has an external shape of the teeth portion.

7. The method for manufacturing the core elements as claimed in claim 6, wherein
    the punch cut out trace shape of the third core element includes:
        a first end, towards a first direction, that has an external shape of the back yoke portion; and
        a second end, towards a second direction opposite to the first direction, that has an external shape of the teeth portion, and
    the punch cut out trace shape of at least one from among the first core element and the second core element includes:
        a first end, towards the first direction, that has an external shape of the teeth portion; and
        a second end, towards the second direction opposite to the first direction, that has an external shape of the back yoke portion.

8. The method for manufacturing the core elements as claimed in claim 1, wherein
  each of the core elements includes a sector shape, that includes:
    a back yoke portion that is configured to be in contact with an external diameter side of the rotary electric machine; and
    a teeth portion configured to protrude to an internal diameter side of the rotary electric machine from the back yoke portion, and
  the core element shaped pilot includes:
    a first portion that has an external shape of the back yoke portion; and
    a second portion that is separate from the first portion and has an external shape of the teeth portion.

9. The method for manufacturing the core elements as claimed in claim 1,
  wherein the performing of the first punch cutting out process further comprises producing pilot holes by punch cutting out the electromagnetic steel sheet with the press mechanism, the pilot holes configured to receive pilot pins and the pilot holes are at respect ends of the electromagnetic steel sheet in a widthwise direction of the electromagnetic steel sheet.

10. The method for manufacturing the core elements as claimed in claim 9, wherein
  the pilot holes are at a position with a displacement toward a feeding direction of the electromagnetic steel sheet, from a central location of the punch cut out trace shape of the first core element, and
  the second punch cutting out process further comprises positioning the electromagnetic steel sheet using the pilot pins with respect to the pilot holes.

11. A method for manufacturing core elements, for use in a divisional layer stack core of a rotary electric machine, by using a press mechanism that includes a feeding device configured to feed an electromagnetic steel sheet that has a shape of a belt, the method comprising:
  performing a first punch cutting out process that comprises punch cutting out, from the electromagnetic steel sheet and with the press mechanism, a first core element having a core element shape;
  performing a feeding process after the first punch cutting out process, the feeding process comprising feeding the electromagnetic steel sheet with the feeding device;
  performing a second punch cutting out process after the feeding process, the second punch cutting out process comprising:
    positioning the electromagnetic steel sheet by using a core element shaped pilot, which has an external shape of the first core element, with respect to a punch cut out trace shape of the first core element; and
    producing a second core element having the core element shape from the electromagnetic steel sheet, by punch cutting out with the press mechanism;
  performing an additional feeding process that comprises feeding the electromagnetic steel sheet with the feeding device; and
  performing a third punch cutting out process that comprises:
    positioning the electromagnetic steel sheet by using an additional core element shaped pilot, which has an external shape of the second core element, with respect to a punch cut out trace shape of the second core element; and
    producing a third core element having the core element shape from the electromagnetic steel sheet, by punch cutting out with the press mechanism.

* * * * *